(No Model.)
H. A. CROSSLEY.
CAR BRAKE.
No. 494,672. Patented Apr. 4, 1893.
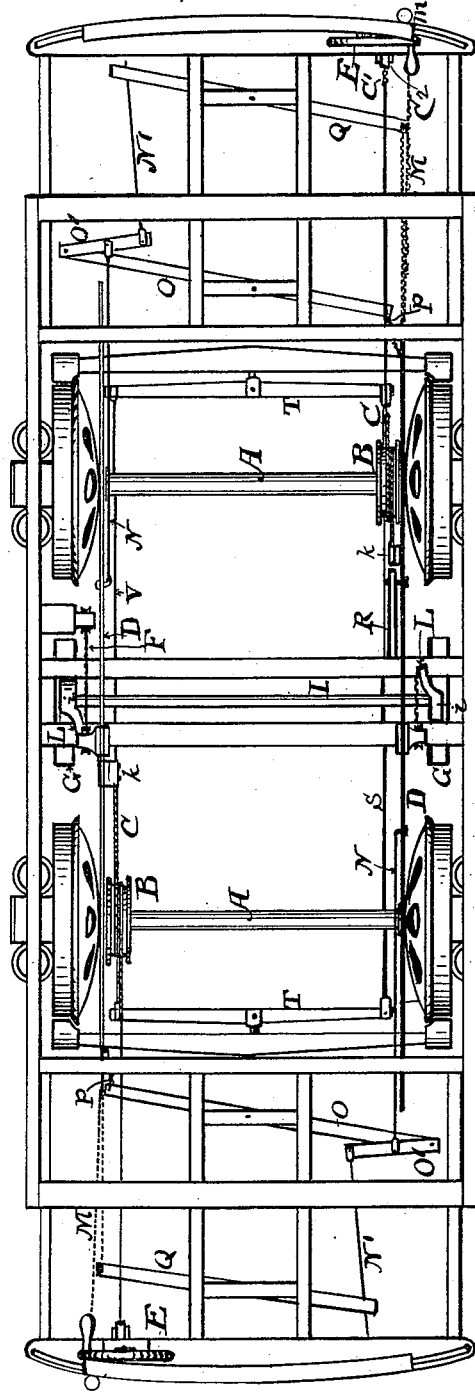
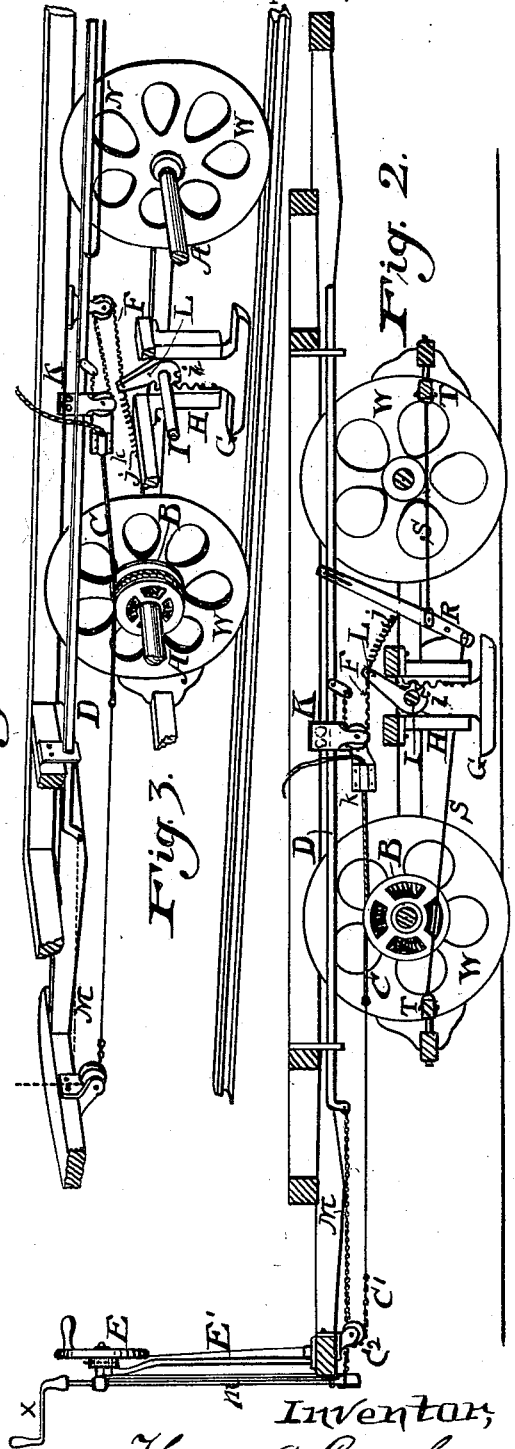
Witnesses
M. M. Barnes.
C. M. Buettner
Inventor,
Harry A. Crossley.
By Geo. W. Tibbitts Atty.

UNITED STATES PATENT OFFICE.

HARRY A. CROSSLEY, OF CLEVELAND, OHIO.

CAR-BRAKE.

SPECIFICATION forming part of Letters Patent No. 494,672, dated April 4, 1893.

Application filed June 23, 1892. Serial No. 437,807. (No model.)

*To all whom it may concern:*

Be it known that I, HARRY A. CROSSLEY, a citizen of the United States, residing at Cleveland, in the county of Cuyahoga and State of Ohio, have invented certain new and useful Improvements in Brakes for Street-Cars, of which the following is a specification.

This invention relates to brakes for motor street cars power being derived from the momentum of the cars, and it consists in the new constructions and combinations, as hereinafter described and pointed out in the claims.

In the accompanying drawings, Figure 1 is a top or plan view of a car truck having my invention embodied therein. Fig. 2 is a longitudinal section of same, showing manner of obtaining and applying power. Fig. 3 is a perspective view of the same portions represented in Fig. 2.

A A are the car axles and W W the car wheels.

B B are spools fixed on the axles near the wheels and C C are ropes coiled or wound around the spools and connected as hereinafter described for applying power derived from said spools and ropes.

D D are sliding bars hung in brackets $d\ d$, at each side of the car truck and over the spools. The forward ends of the ropes are connected by chains and rods with means for pulling, on the platforms.

E is a hand wheel conveniently arranged at the dash board upon a post or standard E'. The chain C' running over a pulley C² under the platform and connected to spool on the hand wheel is provided for taking up the slack of the ropes and tightening them on the spools B B, the spools then do the rest of the pulling for applying the brakes. The other end of the ropes are attached to the bars D D by means of clamps $k\ k$ formed on the sliding pulley brackets K K riding on the bars D D.

F F are chains attached to the bars B B, and passing around the pulleys in the brackets K K, and connected with the levers L L of the track brakes G G. The bars B B are also otherwise connected with the wheel brake mechanism.

The track brakes consist of track bearing shoes G G, having upright arms sliding vertically in hangers H H.

L L are levers having half pinions $i\ i$, meshing with racks in the hangers H H, and the levers are attached on the ends of rock-shaft I, having its bearings in the top ends of shoe heads.

$j\ j$ are springs attached to moving ends of the levers L L for pulling them over for raising the shoes G G when relieved of the chain pull. The operation of these track brakes may now be seen to be that when the levers L L are pulled over by power applied to either of the ropes, the pinions $i\ i$ travel downward on the racks in the hangers and force the shoes down upon the track rails. The pulling of the ropes by the spools B B, draws the pulley brackets forward until the slack of the chains is taken up and then the pull is upon the bars D D, which will also be drawn forward and transmit the force to the brake mechanism.

M M are chains connecting the hand brake crank shafts $m\ m$ with the sliding bars D D, by means of which the brakes may be applied independently of the spools and ropes in case of breakage or other cause, and are provided for emergencies.

The sliding bars D D are connected by rods N N with equalizing lever mechanisms under the platforms at the ends of the car.

O O are levers fulcrumed to cross-pieces in the car framework and have short levers O' O' attached to their longest ends to the middle parts of which are attached the rods N N. From the short levers O' rods N' extend to the ends of the car for connection with trail cars. The other ends of levers O O are connected by links $p\ p$, with the sliding bars D D by means of which an equalization of power is maintained throughout the system of bars and levers.

Q Q are auxiliary levers fulcrumed under the platforms, having one end connected by chains $q\ q$ with the sliding bars D D, and their other ends attached to the rods N'. These levers serve to hold the rods N' and make a connection for same with the other levers, when said rods are not connected with trail cars.

R is an ordinary brake lever fulcrumed to a bracket at one side of the truck, and connected by rods S S, with the brake levers T T, these levers being connected at their opposite ends by a rod V. The top end of brake lever R is slotted and connected by a stud bolt through said slot with the sliding bar D. This is designed as a means for operating the wheel brakes by the hand crank X from one end of the car.

The purpose of attaching the rope by clamp to the bar D is to provide a ready means for repair in case the rope should be broken. Instead of using short pieces of rope, a quantity in coil may be stored in some suitable manner, say under the car seat, and the end passed through the floor and extended around the spool with the end fastened to the rod C', and have the rope back of the spool removably fastened by the clamp K to the bar D.

The mechanism as shown and described is provided for a car to run with either end to the front, and for hauling trail cars, but in the case of a single car, much of the mechanism may be dispensed with.

Having described my invention, I claim as follows:

1. In a power brake mechanism for motor cars, the combination with car axles of spools B, ropes C, sliding bars D and means for pulling the ropes from the car platforms substantially as described.

2. In a power brake mechanism for motor cars, the combination with car axles A, spools B, ropes C, and means for pulling the ropes from the platform, of the track brakes G, hung in the hangers H, levers L having pinions $i$ meshing with racks in the hangers, rock shaft I uniting the levers L and journaled in heads of brake shoes G, chains F connecting levers L through the pulley brackets K with sliding bars D, all adapted to operate substantially as and for the purpose specified.

3. The combination with sliding bars D and ropes C of rope clamp $k$ as and for the purpose specified.

4. The combination of sliding bars D, rods N equalizing levers O and O', rods N', levers Q and links $p$, substantially as and for the purpose specified.

5. The combination of sliding bar D, connected by chain M with hand crank shaft $m$, brake lever R, having slotted connection with sliding bar and fulcrumed to a bracket on the truck frame, and connected by rods S S with brake levers T T, having connecting rod V connecting their opposite ends, substantially as described.

6. In a power brake mechanism for motor cars, the combination with car axles A, of spools B, ropes C, connected with means for pulling from car platforms; sliding bars D, sliding pulley and clamp brackets K; chains F, levers L connected by chains F with the bars D; pinions $i$ on levers L, rock shaft I connecting said levers L and journaled in the heads of the shoes; track shoes G; springs $j$; the equalizing levers O' and O fulcrumed to car frame, and connected by rods N and links $p$ with bars D; levers Q, fulcrumed to platform frames, and connected to levers O' by rods N', all constructed and adapted to operate as and for the purpose specified.

HARRY A. CROSSLEY.

Witnesses:
GEO. W. TIBBITTS,
JAS. B. PASKINS.